United States Patent
Kaneda et al.

(10) Patent No.: US 8,761,459 B2
(45) Date of Patent: Jun. 24, 2014

(54) ESTIMATING GAZE DIRECTION

(75) Inventors: Yuji Kaneda, Kawasaki (JP); Masakazu Matsugu, Yokohama (JP); Katsuhiko Mori, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 187 days.

(21) Appl. No.: 13/194,640

(22) Filed: Jul. 29, 2011

(65) Prior Publication Data

US 2012/0033853 A1 Feb. 9, 2012

(30) Foreign Application Priority Data

Aug. 6, 2010 (JP) .................................. 2010-178074

(51) Int. Cl.
*G06K 9/00* (2006.01)
(52) U.S. Cl.
CPC .................................. G06K 9/00597 (2013.01)
USPC .......................................... 382/118; 382/117
(58) Field of Classification Search
CPC .......... G07C 9/00158; G07C 9/00087; G06K 9/00085; G06K 2009/00932; G06K 9/005297; G06K 9/00604; G06K 9/0061; G06K 9/00228; G06K 9/0021; G06K 9/00288; G06K 9/00281; G06K 9/00248; G06K 9/00302; G06K 9/00221; G06F 21/32; G06F 3/013; G06T 2207/30216; G06T 7/408; G06T 1/00; A61B 3/113
USPC ........................... 382/115, 118, 124, 100, 103
See application file for complete search history.

(56) References Cited

U.S. PATENT DOCUMENTS 6,246,779 B1 6/2001 Fukui et al.
7,039,233 B2 5/2006 Mori et al.
7,054,850 B2 5/2006 Matsugu
7,274,819 B2 9/2007 Matsugu
7,577,297 B2 8/2009 Mori et al.
7,742,623 B1 6/2010 Moon et al.

(Continued)

FOREIGN PATENT DOCUMENTS

| EP | 0990416 A1 | 4/2000 |
|---|---|---|
| EP | 2009557 A1 | 12/2008 |
| JP | 2003-070742 | 3/2003 |
| JP | 2003-256852 A | 9/2003 |
| JP | 2007-265367 A | 10/2007 |
| WO | 02/09025 A1 | 1/2002 |

OTHER PUBLICATIONS

European Search Report dated Oct. 7, 2011 issued in European Patent Application No. 11175065.9.

(Continued)

*Primary Examiner* — Edward Park
(74) *Attorney, Agent, or Firm* — Fitzpatrick, Cella, Harper & Scinto

(57) ABSTRACT

The present invention refers to an information processing apparatus comprising: an obtaining unit adapted to obtain an image of an object; a face region detection unit adapted to detect a face region of the object from the image; an eye region detection unit adapted to detect an eye region of the object; a generation unit adapted to generate a high-resolution image and low-resolution image of the face region detected by the face region detection means; a first extraction unit adapted to extract a first feature amount indicating a direction of a face existing in the face region from the low-resolution image; a second extraction unit adapted to extract a second feature amount indicating a direction of an eye existing in the eye region from the high-resolution image; and an estimation unit adapted to estimate a gaze direction of the object from the first feature amount and the second feature amount.

6 Claims, 9 Drawing Sheets

(56) References Cited

U.S. PATENT DOCUMENTS

| | | | |
|---|---|---|---|
| 7,848,548 | B1 | 12/2010 | Moon et al. |
| 7,881,524 | B2 | 2/2011 | Matsugu et al. |
| 7,912,253 | B2 | 3/2011 | Suzuki et al. |
| 7,995,805 | B2 | 8/2011 | Suzuki et al. |
| 8,401,248 | B1 * | 3/2013 | Moon et al. ............... 382/118 |
| 2005/0180626 | A1 | 8/2005 | Moon et al. |
| 2005/0276481 | A1 * | 12/2005 | Enomoto ............... 382/190 |
| 2006/0074653 | A1 | 4/2006 | Mitari et al. |
| 2006/0115157 | A1 | 6/2006 | Mori et al. |
| 2007/0127785 | A1 * | 6/2007 | Hiraizumi et al. ......... 382/118 |
| 2007/0230797 | A1 | 10/2007 | Hisanaga |
| 2009/0089235 | A1 | 4/2009 | Torii et al. |
| 2009/0157707 | A1 | 6/2009 | Ito et al. |
| 2009/0219405 | A1 | 9/2009 | Kaneda et al. |
| 2009/0324060 | A1 | 12/2009 | Sato et al. |
| 2010/0329556 | A1 | 12/2010 | Mitarai et al. |
| 2011/0091115 | A1 | 4/2011 | Kato et al. |
| 2011/0158535 | A1 | 6/2011 | Iio et al. |
| 2011/0158540 | A1 | 6/2011 | Suzuki et al. |

OTHER PUBLICATIONS

Newman, Rhys, et al., "Real-Time Stereo Tracking for Head Posed and Gaze Estimation", Research School of Information Sciences and Engineering, Australian National University Canberra ACT 0200, pp. 122-128, 2000.

U.S. Appl. No. 13/207,190, filed Aug. 10, 2011. Applicants: Hiroto Yoshii, et al.

U.S. Appl. No. 13/207,143, filed Aug. 10, 2011. Applicants: Shunta Tate, et al.

U.S. Appl. No. 13/218,976, filed Aug. 26, 2011. Applicants: Yusuke Mitarai, et al.

P. Viola, et al., "Rapid Object Detection using a Boosted Cascade of Simple Features", in Proc. of CVPR, vol. 1, pp. 511-518, Dec. 2001.

Y. Mitarai, et al., "Robust Face Detection System Based on Convolutional Neural Networks Using Selective Activation of Modules", FIT (Forum on Information Technology), LI-013, 2003.

A. Suzuki, et al., "Eye Detection Using PCA Correlation Filter", FIT (Forum on Information Technology), H-015, 2007.

M. Bertozzi, et al., "A Pedestrian Detector Using Histograms of Oriented Gradients and a Support Vector Machine Classifier", IEEE Intelligent Transportation Systems Conference, 2007.

V. Vapnik, "Statistical Learning Theory", John Wiley & Sons, 1998.

Satoshi Shirai, et al., "Detection of the Gaze Direction for Detection of the Driver's Status", Technical Report of the Institute of Electronics, Information and Communication Engineers, vol. 103 No. 453, Japan, the Institute of Electronics, Information and Communication Engineers, Nov. 14, 2003.

\* cited by examiner

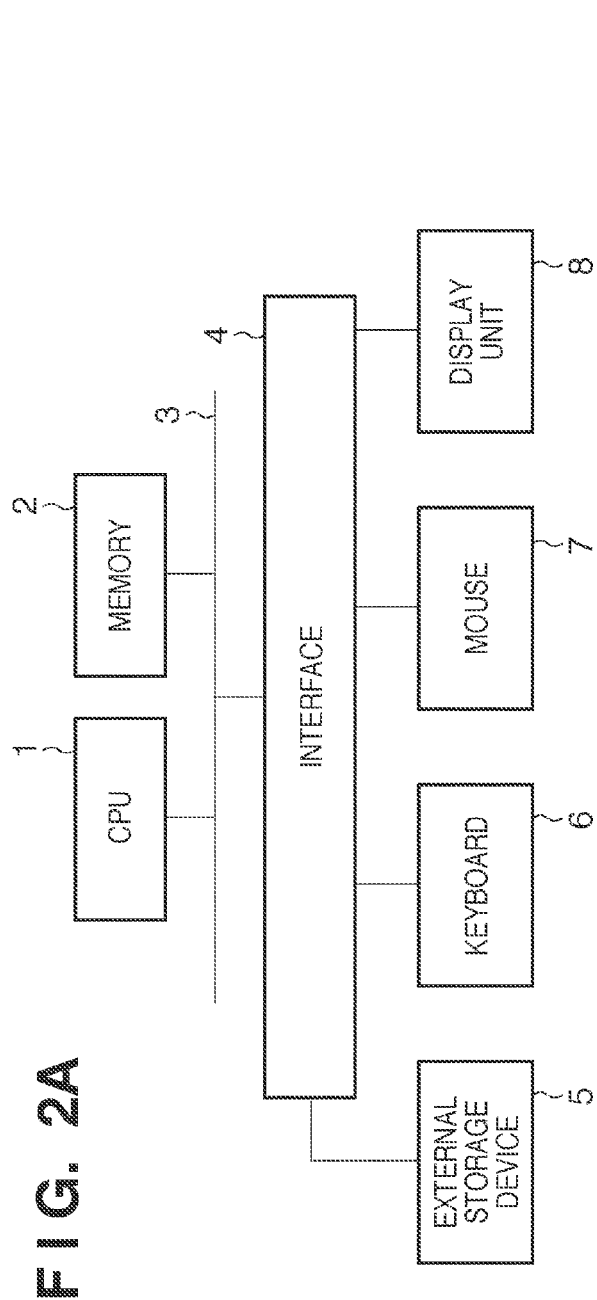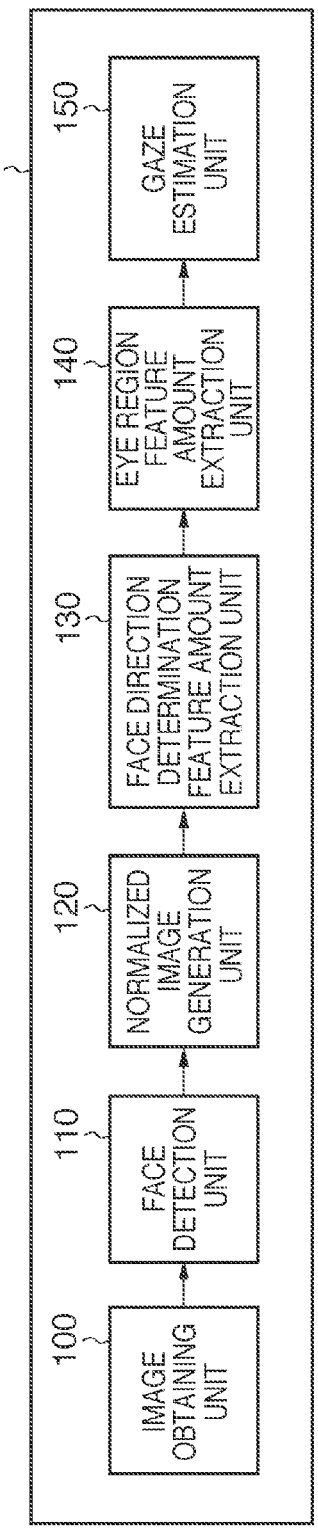

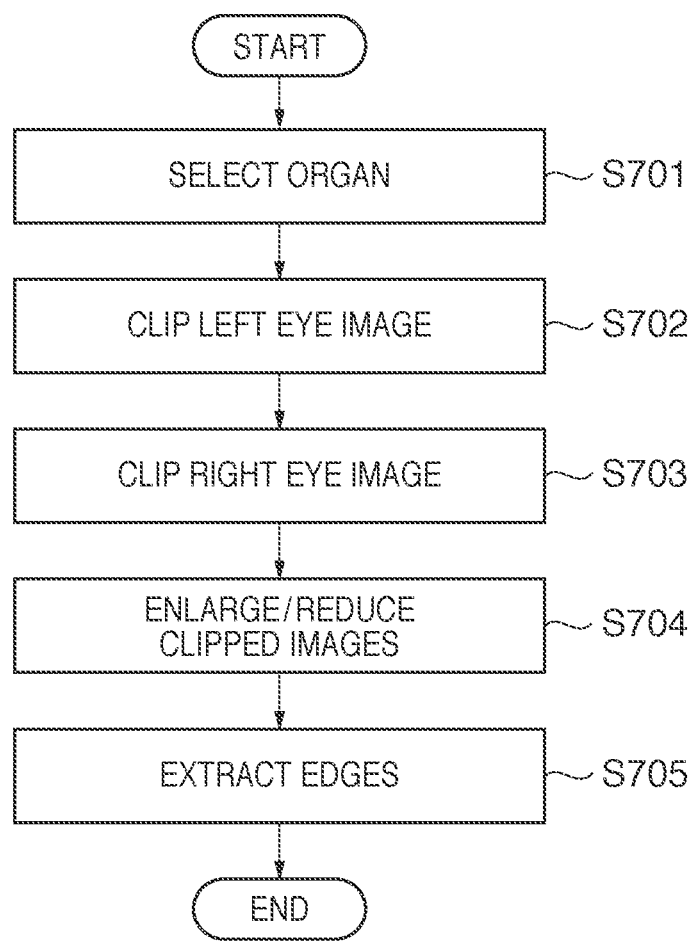

ESTIMATING GAZE DIRECTION

BACKGROUND OF THE INVENTION

1. Field of the Invention

The present invention relates to an information processing apparatus which detects the gaze direction of an object, an information processing method for use therewith, and a storage medium for storing a computer program for causing a computer to perform the method.

2. Description of the Related Art

Japanese Patent Laid-Open No. 2003-256852 discloses a technique of detecting the direction of an eye by using a face image including the black parts of the left and right eyes and external canthi. This technique is however designed to estimate only a direction $\alpha 1$ of an eye as shown in FIG. 1 without any consideration to a direction $\beta 1$ of the face.

Japanese Patent Laid-Open No. 2007-265367 discloses a technique of estimating the gaze direction of an eye (i.e. the direction in which the eye is pointing) from both the direction $\alpha 1$ of the eye and the direction $\beta 1$ of the face shown in FIG. 1 by detecting feature points such as the eyes from a face in an image and using the distance between the detected feature points (i.e. the distance between the two eyes). Many of the techniques of the background art are designed to calculate the direction $\alpha 1$ of the eye and the direction $\beta 1$ of the face based on the location relationship between organs (such as nose, eyes, mouth, and their feature points) of the face, as disclosed in Japanese Patent Laid-Open No. 2007-265367. In addition, many techniques estimate a gaze direction from both the direction $\alpha 1$ of the eye and the direction $\beta 1$ of the face upon separately calculating them.

The first problem is that if the coordinate information of feature points is directly used for gaze detection as in Japanese Patent Laid-Open No. 2007-265367, the feature point detection accuracy itself becomes the estimation accuracy of a gaze direction. That is, the deviation of at least one of detected feature points from a desired position may greatly degrade the gaze detection accuracy.

The second problem is that the technique which separately calculates the direction $\alpha 1$ of the eye and the direction $\beta 1$ of the face may lead to the accumulation of errors originating from the respective calculations, and hence cannot estimate a gaze direction with high accuracy.

The third problem is that in order to estimate a gaze direction with high accuracy, it is also necessary to consider individual differences such as the sizes of the eyes.

In consideration of the above problems, the present invention provides a technique of estimating a gaze direction with high accuracy independently of individual differences among objects.

SUMMARY OF THE INVENTION

According to one aspect of the present invention, there is provided an information processing apparatus comprising: an obtaining unit adapted to obtain an image of an object captured by an image sensing unit; a face region detection unit adapted to detect a face region of the object from the image; an eye region detection unit adapted to detect an eye region of the object from the image; a generation unit adapted to generate a high-resolution image and low-resolution image from the obtained image of the face region detected by the face region detection unit; a first extraction unit adapted to extract a first feature amount indicating a direction of a face existing in the face region from the low-resolution image; a second extraction unit adapted to extract a second feature amount indicating a direction of an eye existing in the eye region from the high-resolution image; and an estimation unit adapted to estimate a gaze direction of the object from the first feature amount and the second feature amount.

According to one aspect of the present invention, there is provided an information processing method comprising: an obtaining step of obtaining an image of an captured object; a face region detection step of detecting a face region of the object from the obtained image; an eye region detection step of detecting an eye region of the object from the obtained image; a generation step of generating a high-resolution image and low-resolution image from the obtained image of the face region detected in the face region detection step; a first extraction step of extracting a first feature amount indicating a direction of a face existing in the face region from the low-resolution image; a second extraction step of extracting a second feature amount indicating a direction of an eye existing in the eye region from the high-resolution image; and an estimation step of estimating a gaze direction of the object from the first feature amount and the second feature amount.

Further features of the present invention will be apparent from the following description of exemplary embodiments with reference to the attached drawings.

BRIEF DESCRIPTION OF THE DRAWINGS

FIG. 2A is a block diagram showing the hardware arrangement of a gaze detection apparatus 10;

FIG. 2B is a block diagram showing the functional arrangement of the respective processing units of the gaze detection apparatus 10;

FIG. 7 is a flowchart showing a procedure for feature amount extraction processing for eye regions;

DESCRIPTION OF THE EMBODIMENTS

Figure 1:
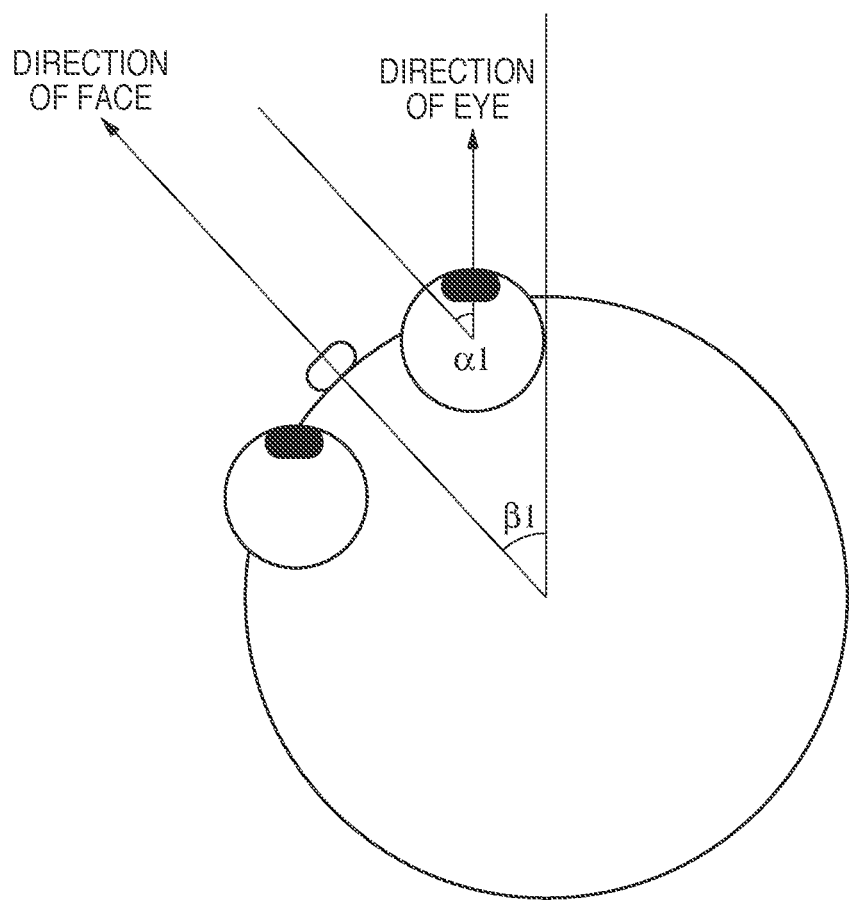
FIG. 1 is a view showing the definition of a gaze direction.

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

The hardware arrangement of a gaze detection apparatus 10 as an information processing apparatus which detects the gaze direction of an object according to this embodiment will be described first with reference to FIG. 2A. A CPU 1 controls the operation of the overall apparatus, and more specifically, the operation of each processing unit (to be described later). A memory 2 stores programs and data used for the operation of the CPU 1. A bus 3 is in charge of data transfer between the respective processing units. An interface 4 interfaces with the bus 3 and various types of apparatuses. An external storage device 5 stores programs and data to be loaded into the CPU 1. A keyboard 6 and a mouse 7 constitute an input device for activating a program or designating the operation of a program. A display unit 8 displays the operation result of a process.

The functional arrangement of the respective processing units of the gaze detection apparatus 10 will be described next with reference to FIG. 2B. The gaze detection apparatus 10 includes an image obtaining unit 100, a face detection unit 110, a normalized image generation unit 120, a face direction determination feature amount extraction unit 130, an eye region feature amount extraction unit 140, and a gaze estimation unit 150.

The image obtaining unit 100 obtains an image captured by an image sensing apparatus or the like.

The face detection unit 110 detects the face region of an object from the image obtained by the image obtaining unit 100, and also detects the central position of the face. The face detection unit 110 also detects the central positions of the respective parts of a face, such as the eyes and the mouth, smaller feature points such as the external and internal canthi, the positions of organs such as the positions of the pupils, and the like.

The normalized image generation unit 120 normalizes an image by using the positions detected by the face detection unit 110 so as to set the size of the face to a predetermined size and orient the face in an erect position. The normalized image generation unit 120 also generates a plurality of normalized images with different resolutions.

The face direction determination feature amount extraction unit 130 extracts feature amounts for determining the direction of the face from the image generated by the normalized image generation unit 120.

The eye region feature amount extraction unit 140 extracts eye region feature amounts from the image generated by the normalized image generation unit 120.

The gaze estimation unit 150 estimates a gaze direction by using the feature amounts for determining the direction of the face, which are extracted by the face direction determination feature amount extraction unit 130, and the eye region feature amounts extracted by the eye region feature amount extraction unit 140.

Figure 3:
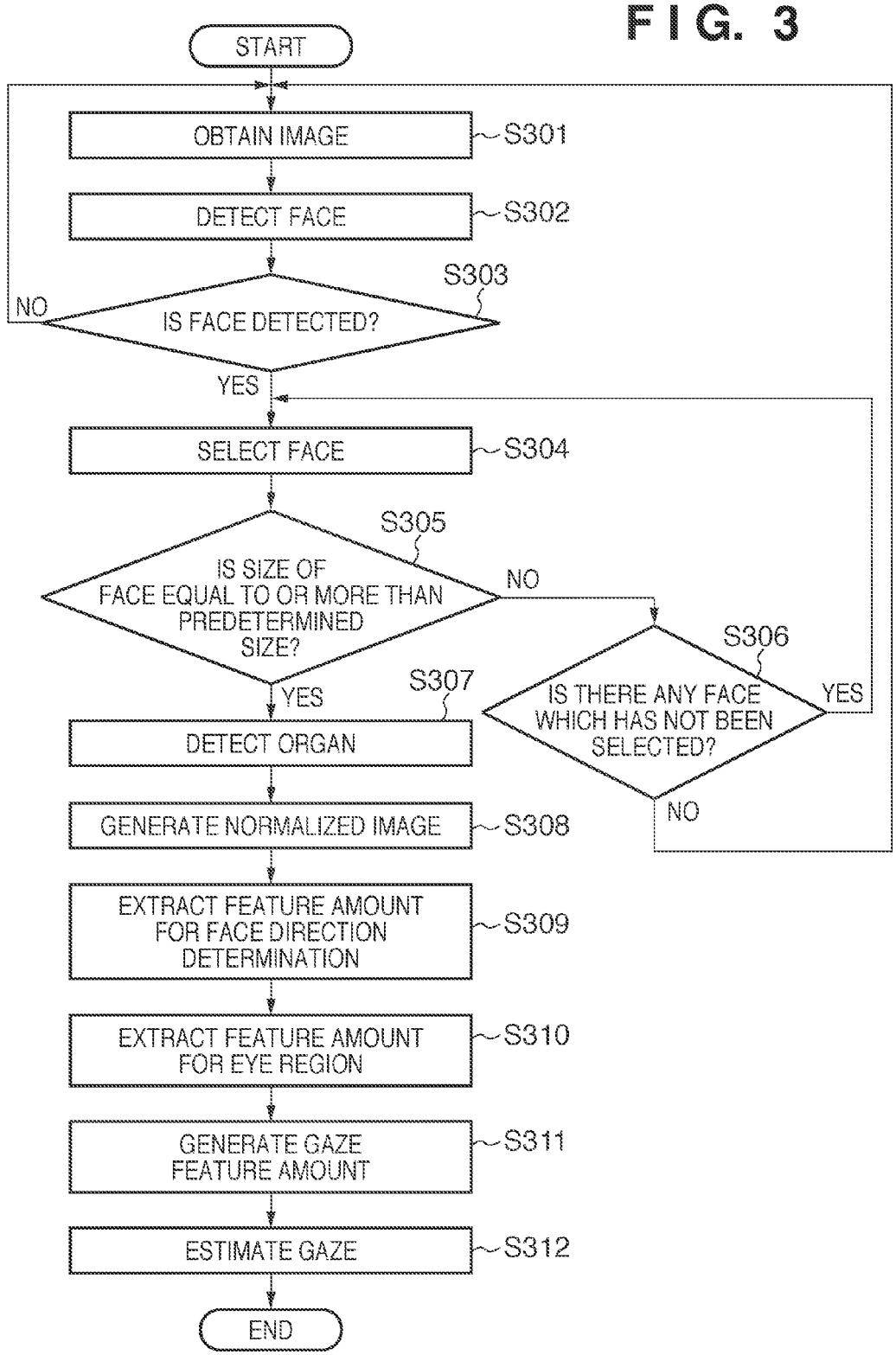
FIG. 3 is a flowchart showing a procedure for gaze detection processing.

A procedure for gaze detection processing will be described next with reference to the flowchart of FIG. 3.

In step S301, the image obtaining unit 100 obtains an image by using one of various methods. For example, the image obtaining unit 100 obtains a face image captured by an image sensing apparatus such as a digital camera and stored in a nonvolatile memory or the like. The image obtaining unit 100 may obtain a face image stored in a hard disk drive.

In step S302, the face detection unit 110 detects the central position of a face as the position of a face region in the image obtained in step S301. The face detection unit 110 also detects the central position of an eye as the position of an eye region of the object.

Figure 4:
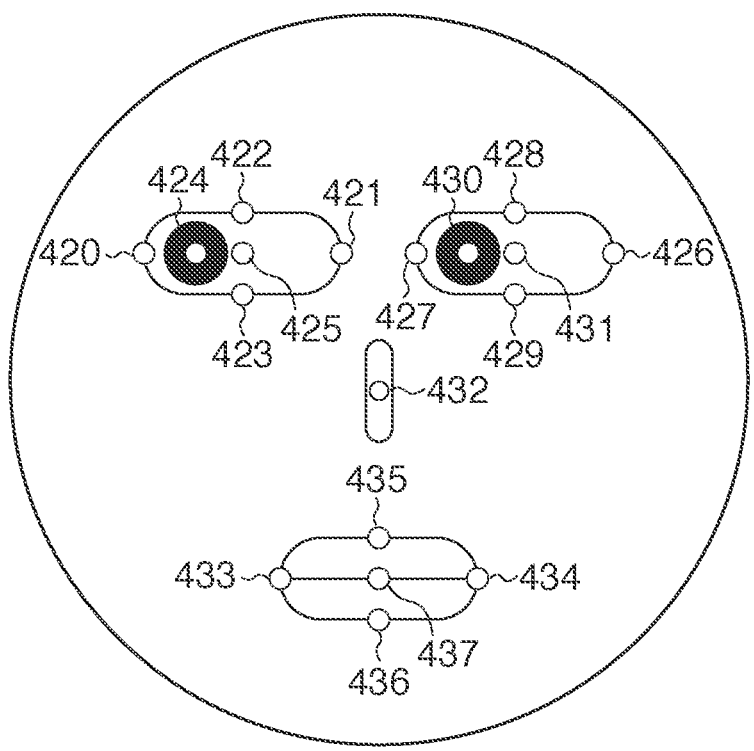
FIG. 4 is a view showing organs, feature points, and pupils detected by face detection and organ detection.

In step S303, the face detection unit 110 determines whether a face is detected from the image. If the face detection unit 110 determines that a face is detected (YES in step S303), the process advances to step S304. If the face detection unit 110 determines that no face is detected (NO in step S303), the process returns to step S301. This embodiment handles the face of a person as a target. However, it is possible to handle the face of an animal such as a dog or a cat. For example, a central position 432 of a face like that shown in FIG. 4 is obtained. Note that various techniques of detecting faces are available (see, for example, P. Viola and M. Jones, "Rapid Object Detection using a Boosted Cascade of Simple Features", in Proc. Of CVPR, vol. 1, pp. 511-518, December, 2001). In addition, a technique of detecting a face by using a neural network is available (see, for example, Yusuke Mitarai, Katsuhiko Mori, and Masakazu Matsugu, "Robust Face Detection System Based on Convolutional Neural Networks Using Selective Activation of Modules", FIT (Forum on Information Technology), Ll-013, 2003). Note any technique can be used as long as it can detect the face of a person. Note that also the face detection technique disclosed in Yusuke Mitarai, Katsuhiko Mori, and Masakazu Matsugu, "Robust Face Detection System Based on Convolutional Neural Networks Using Selective Activation of Modules", FIT (Forum on Information Technology), Ll-013, 2003 may be used to detect eyes and a mouth and determine based on the location relationship between them whether the detected object is a face. In this case, it is possible to obtain central positions 425, 431, and 437 of the eyes and mouth respectively in addition to the central position 432 of the face. This embodiment uses the technique disclosed in Yusuke Mitarai, Katsuhiko Mori, and Masakazu Matsugu, "Robust Face Detection System Based on Convolutional Neural Networks Using Selective Activation of Modules", FIT (Forum on Information Technology), Ll-013, 2003. In step S302, therefore, the central positions 425, 431, and 437 of the eyes and mouth are, according to one embodiment, obtained in addition to the central position 432 of the face.

In step S304, one of the faces detected in step S302 is selected.

In step S305, the face detection unit 110 determines whether the size of the face selected in step S304 is equal to or more than a predetermined size. If the face detection unit 110 determines that the size of the face is equal to or more than the predetermined size (YES in step S305), the process advances to step S307. If the face detection unit 110 determines that the size of the face is smaller than the predetermined size (NO in step S305), the process advances to step S306. The gaze direction of a person with a small face (or of a face in the obtained image that is small because of the object being far away from the image obtaining unit) may not be detected with high accuracy because of the lack of the amount of information. For this reason, this embodiment executes gaze detection for only faces having sizes equal to or more than a predetermined size. Information for the determination of the size of a face may include, for example, the distance between the central position 425 of the left eye and the central position 431 of the right eye, as shown in FIG. 4, and the area of a skin color portion as long as they are measures indicating the size of the face. Note that in this embodiment, the eye located on the left side relative to the observation direction of the drawing will be referred to as the left eye, and the eye located on the right side will be referred to as the right eye. In the embodiment, the double of the distance between the central position 425 of the left eye and the central position 431 of the right eye is defined as the size of the face. For example, based on the central position 432 of the face detected in step S302, the face detection unit 110 sets a range in which the left and right eyes can statistically exist is set, and searches for the eyes by using a template prepared in advance within the range. It is then possible to calculate the distance between the central position 425 of the left eye and the central position 431 of the right eye.

In step S306, the face detection unit 110 determines whether the faces detected in step S302 include any face that has not been selected in step S304. If the face detection unit 110 determines that not all the faces have been selected (NO in step S306), the process returns to step S301 to obtain another image. If the face detection unit 110 determines that all the faces have been selected (YES in step S306), the process returns to step S304 to select a face which has not been selected.

In step S307, the face detection unit 110 detects feature points of organs of the face in addition to the central position 432 of the face and the like. That is, the face detection unit 110 detects feature point positions of organs such as an internal canthus feature point 421, an internal canthus feature point 427, an external canthus feature point 420, an external canthus feature point 426, an upper eyelid feature point 422, an upper eyelid feature point 428, a lower eyelid feature point 423, and a lower eyelid feature point 429. The face detection unit 110 may detect feature point positions of pupils 424 and 430. Although it is possible further to detect a feature point such as a mouth, this embodiment detects only minimum necessary organs. In the case of further detecting feature points of a mouth, as shown in FIG. 4, the face detection unit 110 detects feature point positions of a mouth such as mouth side feature points 433 and 434, an upper lip feature point 435, and a lower lip feature point 436. Note that as a method of detecting the positions of these organs, it is possible to use one of various techniques such as a technique using a template prepared in advance and the like and a technique of detecting such positions by scanning edges.

Figure 5:
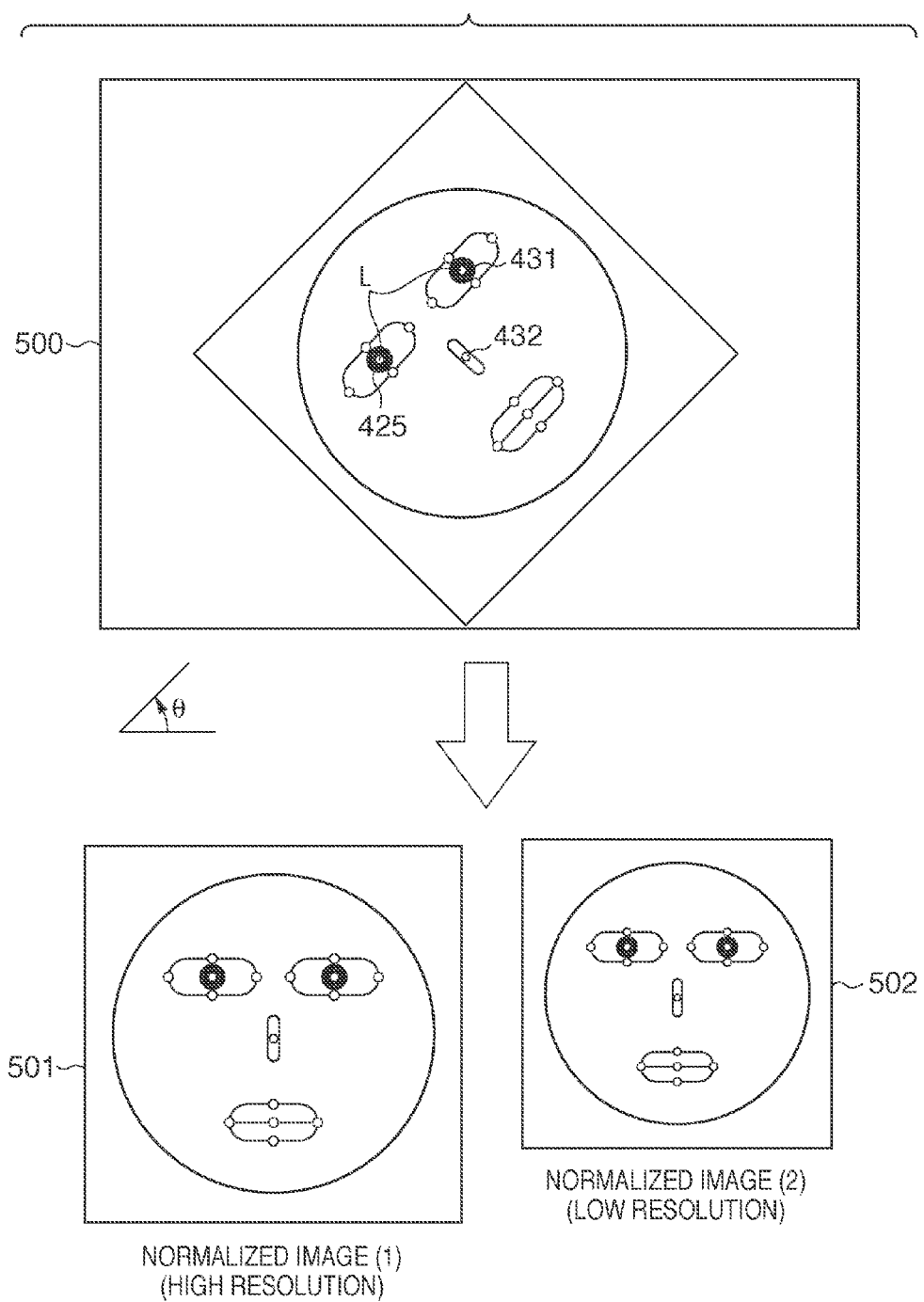
FIG. 5 is a view showing two different resolution images generated by normalization processing.

In step S308, the normalized image generation unit 120 normalizes the image by using the positional relationship between the central position 425 of the left eye, the central position 431 of the right eye, and the central position 432 of the face detected in step S302. In this case, the normalized image generation unit 120 generates two types of images with different resolutions, each having a face oriented in an erect position and having a predetermined size, by using affine transformation or the like. More specifically, as shown in the image 500 in FIG. 5, the normalized image generation unit 120 calculates a distance L between the central position 425 of the left eye and the central position 431 of the right eye and an angle θ relative to the horizontal direction, and performs affine transformation so as to set the distance L to a predetermined distance L' and set θ=0. For enlargement/reduction of an image, it is possible to use various methods such as a nearest neighbor method and a bilinear method. Although this embodiment uses the central position 425 of the left eye, the central position 431 of the right eye, and the central position 432 of the face for the normalization of an image, positions to be detected are not limited to them. These two types of normalized images 501 and 502 are used to extract feature amounts for face direction determination and feature amounts of eye regions, respectively. In addition, it is possible to execute luminance value conversion processing such as contrast correction processing for reducing the influence of illumination. Note that as long as the conditions for the direction and size of a face to be imaged remain constant, size correction and inclination correction are not essential processes. As a high-resolution image of two types of images with different resolutions, an input image can be used without changing its resolution.

In addition, the number of types of normalized images with different resolutions which are to be generated are not limited to two. It is possible to generate a plurality of resolution images (pyramid images) with different resolutions in advance and select some of them. Generating a plurality of resolution images (pyramid images) with different resolutions in advance in this manner allows to effectively use the images for pattern recognition and the like in addition to the gaze detection apparatus according to this embodiment. In addition, it is possible to generate, stepwise, a high-resolution image used to extract feature amounts of eye regions first and then generate a low-resolution image used to extract feature amounts for face direction determination by reduction processing.

As described above, the gaze detection apparatus according to this embodiment generates images with different resolutions in accordance with the direction of a face exhibiting a large change amount and the direction of an eye exhibiting a small change amount.

Figure 6A:
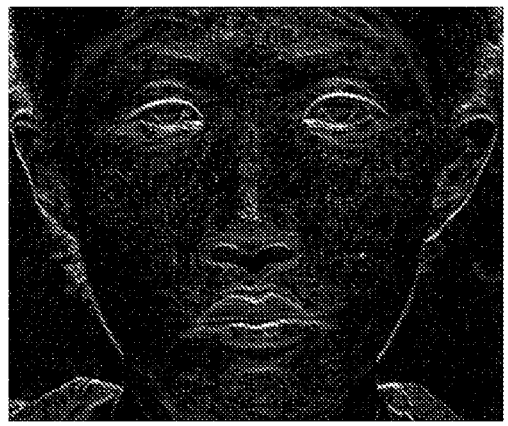
FIGS. 6A to 6D are views showing edge detection results.
Figure 6B:
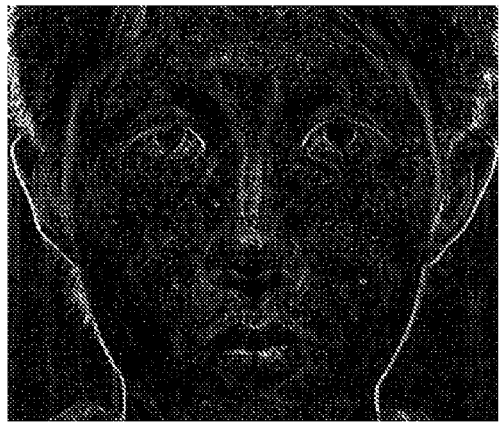
Figure 6C:
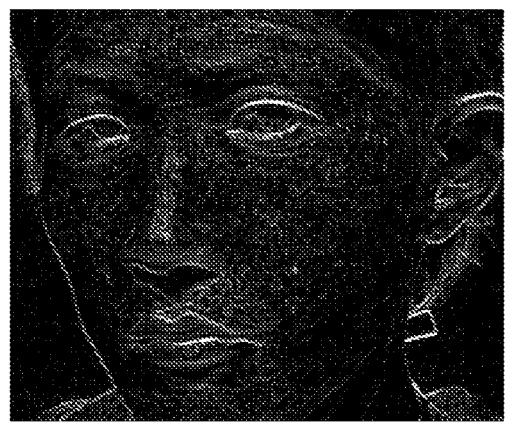
Figure 6D:
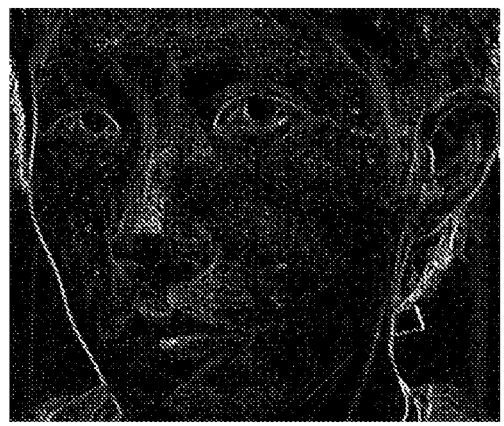

Referring to FIG. 3 again, in step S309, the feature amount extraction unit 130 extracts the first feature amount for face direction determination. The feature amount extraction unit 130 can use any type of feature amount as long as it is a feature amount allowing face direction determination. This embodiment uses an edge feature as the first feature amount. When extracting a feature amount for face direction determination, the feature amount extraction unit 130 uses the low-resolution normalized image 502 of the two types of normalized images generated in step S308. When extracting an edge feature, it is a general practice to use a method using the first and second derivative values of pixel values constituting an image. This embodiment extracts an edge feature by using the first derivation. FIGS. 6A and 6C show the first derivative edges in the X direction. FIGS. 6B and 6D show the first derivative edges in the Y direction. The embodiment uses the positions and shapes of contour edges of a face. It is however possible to use the positions, shapes, and the like, of the ears, nose, hairs, etc.

In step S309, the feature amount extraction unit 130 generates, as a feature amount of a region, a feature vector including pixel values constituting the first derivative edge image in the X direction and the first derivative edge image in the Y direction themselves as one type of elements. If, for example, the first derivative edge image in the X direction and the first derivative edge image in the Y direction each include 30×30 pixels, a 30×30×2=1800 dimensional feature vector is generated.

Note that as feature amounts, it is possible to use, in addition to edge features, luminances, colors, frequencies like those described in Akiko Suzuki, Tetsuya Takiguchi, and Yasuo Ariki, "Eye Detection Using PCA Correlation Filter", FIT (Forum on Information Technology), H-015, 2007, and luminance histograms like those described in M. Bertozzi, A. Broggi, M. Del Rose, M. Felisa, A. Rakotomamonjy, and F. Suard, "A Pedestrian Detector Using Histograms of Oriented Gradients and a Support Vector Machine Classifier", IEEE Intelligent Transportation Systems Conference, 2007.

In step S310, the feature amount extraction unit 140 extracts the second feature amounts of eye regions by using the high-resolution normalized image 501 of the two types of normalized images generated in step S308. That is, the motions of the pupils are minute, and hence the high-resolution normalized image 501 is used to accurately grasp the minute motions.

When detecting the direction of the face, the entire face region may be used. In contrast, when detecting the direction of an eye, only the feature amount of an eye region may be used. Adding a feature amount other than the feature amount of an eye region may increase the number of dimensions of a feature vector and increase the processing load on the subsequent stages. In addition, a feature amount other than that of an eye region may adversely affect the gaze detection accuracy. For this reason, an eye region is limited by using a feature point. In addition, normalization processing is executed to perform processing independently of individual differences in the sizes of eyes.

A procedure for eye region feature amount extraction processing in step S310 will be described below with reference to FIG. 7.

In step S701, the feature amount extraction unit 140 selects four types of feature points of the left and right eyes (the external canthus feature points 420 and 426, internal canthus feature points 421 and 427, upper eyelid feature points 422 and 428, and lower eyelid feature points 423 and 429, for example) of the respective positions detected in steps S302 and S307. That is, the feature amount extraction unit 140 calculates the positions of feature points indicating the eye regions in the high-resolution normalized image.

Figure 8A:
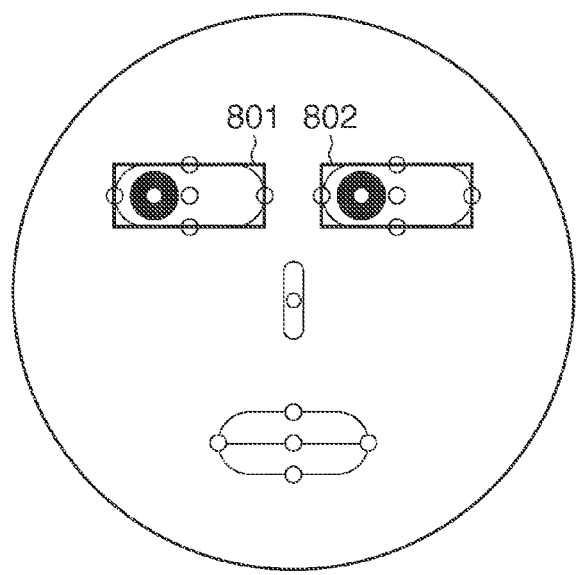
FIG. 8A is a view showing the left and right eye regions set based on feature points of the eyes.

In step S702, the feature amount extraction unit 140 clips a left eye region image 801 by using the four feature points 420, 421, 422, and 423 associated with the left eye, as shown in FIG. 8A.

Subsequently, in step S703, as in step S702, the feature amount extraction unit 140 clips a right eye region image 802 by using the four feature points 426, 427, 428, and 429 associated with the right eye, as shown in FIG. 8A.

Figure 8B:
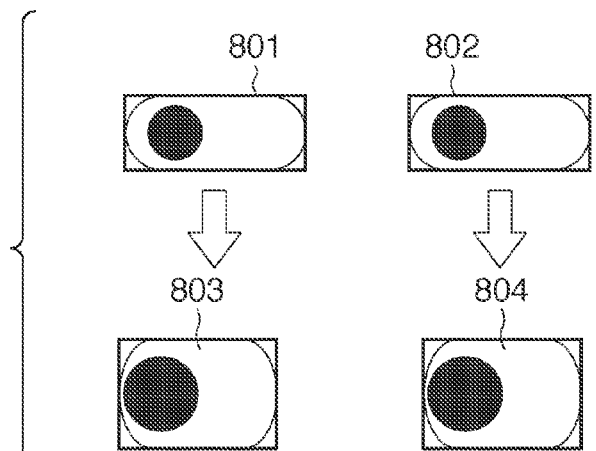
FIG. 8B is a view showing the normalization of the eye regions set based on the feature points of the eyes.
Figure 8C:
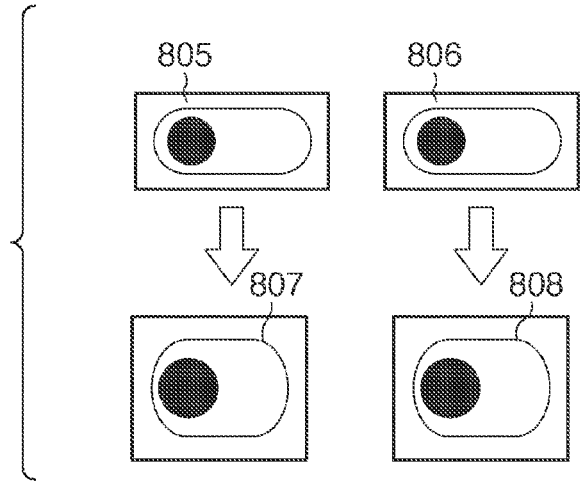
FIG. 8C is a view showing the eye regions set so as to sufficiently include the eyelids based on the feature points of the eyes.

In step S704, the feature amount extraction unit 140 obtains normalized images by executing region enlargement/reduction processing for the left eye region image 801 and right eye region image 802 clipped in steps S702 and S703 such that the widths and heights of the respective images are set to predetermined values, as shown in FIG. 8B. The images 801 and 802 are enlarged/reduced into images 803 and 804, respectively. This makes it possible to perform processing independently of individual differences in the sizes of eyes. Note that in the processing of clipping the left and right eye regions in steps S702 and S703, rather than the feature amount extraction unit 140 clipping regions so as to pass through the respective feature points as shown in FIG. 8B, it may clip the regions so as to include the contours of the eyes as shown in FIG. 8C. For example, the feature amount extraction unit 140 may set and clip regions larger than rectangular regions passing through the respective feature points by a predetermined size like images 805 and 806. Likewise, the images 805 and 806 are enlarged/reduced into images 807 and 808, respectively.

In step S705, the feature amount extraction unit 140 extracts edge features from the normalized images of the left and right eye regions in the same manner as that in step S309. That is, the feature amount extraction unit 140 obtains a total of four edge images including the first derivative edge images in the X and Y directions extracted from the normalized image of the left eye image and the first derivative edge images in the X and Y directions extracted from the normalized image of the right eye image. Assume that feature vectors including pixel values constituting the four obtained edge images themselves as one type of element are feature amounts of the eye regions based on the consideration of the left and right eyes. Note that in step S705, the feature amount extraction unit 140 grasps the motion of each pupil in the lateral direction from the boundary edge between the pupil and the white part of the eye, and also grasps the motion of the pupil in the vertical direction from the boundary edge between the pupil and the white part of the eye and the upper eyelid edge. However, it is possible to add the matching result with a circular template for the detection of a pupil region as a feature amount of the eye region instead of simple edges in the X and Y directions.

Note that it is possible to use, in addition to edge features, luminances, colors, and/or frequencies like those described in Akiko Suzuki, Tetsuya Takiguchi, and Yasuo Ariki, "Eye Detection Using PCA Correlation Filter", FIT (Forum on Information Technology), H-015, 2007, and luminance histograms like those described in M. Bertozzi, A. Broggi, M. Del Rose, M. Felisa, A. Rakotomamonjy, and F. Suard, "A Pedestrian Detector Using Histograms of Oriented Gradients and a Support Vector Machine Classifier", IEEE Intelligent Transportation Systems Conference, 2007.

As described above, in order to improve the performance of the gaze detection apparatus and reduce the processing load, feature points are detected and eye regions are limited when feature amounts of the two eye regions are to be extracted. In addition, executing normalization processing for the sizes of the eyes by using detected feature points can perform processing independently of individual differences in the sizes of the eyes. With the above operation, the processing shown in FIG. 7 is complete. That is, the processing in step S310 is terminated.

Referring to FIG. 3 again, in step S311, the gaze estimation unit 150 generates a gaze feature amount by coupling the first feature amount (in the form of a first feature vector) for face direction determination obtained in step S309 to the second feature amount (in the form of a second feature vector) of the two eye regions obtained in step S310. In this case, the first feature vector allowing face direction determination and the second feature vector of two eye regions are preferably normalized before they are coupled to each other.

In step S312, the gaze estimation unit 150 compares the gaze feature amount generated in step S311 with a feature amount prepared in advance by using an identification device to estimate whether the gaze direction coincides with a predetermined direction.

Figure 9:
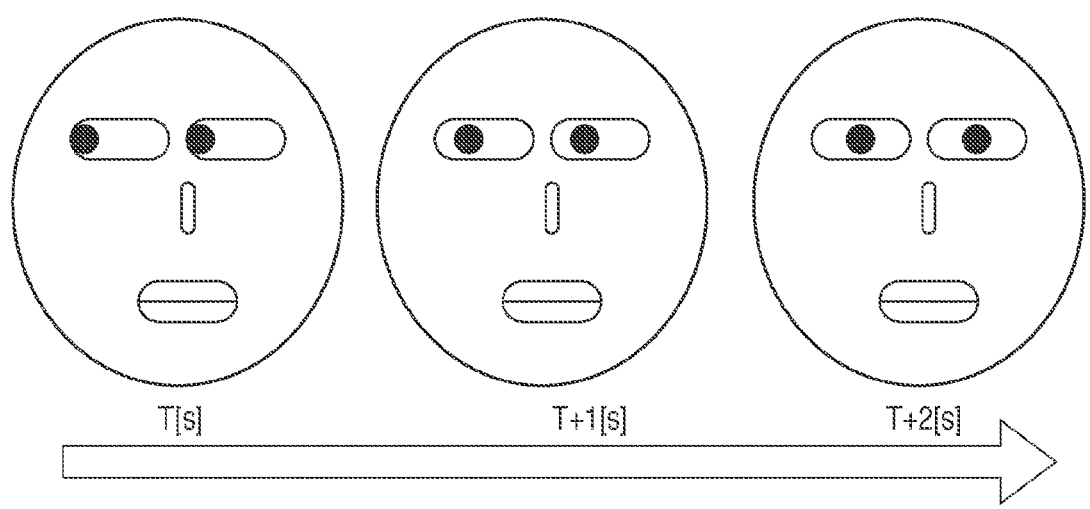
FIG. 9 is a view showing the gaze directions of various faces.

For example, this apparatus estimates whether an object faces a camera or the like. In this case, an identification device which estimates a gaze direction learns in advance. That is, the apparatus uses a positive gaze feature amount corresponding to a state in which the gaze coincides with the direction of the camera as indicated by T+2[s] in FIG. 9 and a negative gaze feature amount indicating a state in which the gaze direction does not coincide with the direction of the camera as indicated by T[s] and T+1[s] in FIG. 9. The apparatus then generates an identification model by using a support vector machine (to be referred to as an "SVM" hereinafter) like that disclosed in V. Vapnik, "Statistical Learning Theory", John Wiley & Sons, 1998, and estimates, by using the generated identification model, whether the gaze direction coincides with the direction of the camera or the like. Although this embodiment uses an SVM as an identification device which estimates a gaze direction, the identification device to be used is not limited to an SVM.

In addition, this embodiment performs binary determination to determine whether a gaze direction coincides with the direction of the camera. However, it is possible to detect a specific gaze direction by preparing a plurality of identification devices which respectively detect that the gaze is oriented in specific different directions. With the above operation, the processing in FIG. 3 is complete. Note that not all of the respective processes in the flowchart of FIG. 3 or 7 are required, and their order of execution may be changed or some processes may be omitted.

As described above, the gaze detection apparatus according to this embodiment directly estimates a gaze direction by using appearance features (a face contour, an eyelid shape, the boundary between a pupil and a white part of the eye, and the like) allowing determination of the directions of the eye and face as feature amounts instead of separately estimating the direction $\alpha 1$ of the eye and the direction $\beta 1$ of the face.

In this case, the apparatus extracts feature amounts from a low-resolution image for a face exhibiting a large change amount, and extracts feature amounts from a high-resolution image for the direction of an eye exhibiting a small change amount. In this way, less processing is required to determine coarser features such as the face feature amounts and the greater processing that is preferable for efficiently finding eye-related feature amounts is performed on the higher-resolution image, but only for those finer feature amounts. In order to improve the performance and reduce the processing load further, the apparatus detects feature points of eyes and limits eye regions. In addition, it is possible to perform processing independently of individual differences in the sizes of eyes by normalizing the sizes of eyes by using feature points.

With the above arrangement, it is possible to execute robust gaze detection with high accuracy independently of individual differences in the sizes of eyes, while minimizing the processing load.

Note that the gaze detection apparatus according to this embodiment can be used for various applications such as the operation of capturing an image when the gaze coincides with the direction of a digital camera by mounting the gaze detection apparatus in an image sensing apparatus including a storage unit such as a digital camera.

According to the embodiments mentioned above, it is possible to estimate a gaze direction with high accuracy independently of individual differences among objects.

Other Embodiments

Aspects of the present invention can also be realized by a computer of a system or apparatus (or devices such as a CPU (central processing unit) or MPU (microprocessing unit)) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-178074 filed on Aug. 6, 2010, which is hereby incorporated by reference herein in its entirety.

What is claimed is:

1. An information processing apparatus comprising:
    a detection unit adapted to detect a face region and an eye region of an object from an obtained image of the object;
    a generation unit adapted to generate normalized images of a high-resolution image and low-resolution image from the obtained image of the face region based on a positional relationship between the face region and the eye region in the image;
    a first extraction unit adapted to extract a first feature amount indicating a direction of a face existing in the face region from the low-resolution image;
    a feature point detection unit adapted to detect a position of a feature point indicating the eye region in the normalized image of the high-resolution image;
    a clipping unit adapted to clip the eye region in the normalized image of the high-resolution image based on the position of the feature point detected by said feature point detection unit;
    an enlargement/reduction unit adapted to enlarge or reduce the eye region clipped by said clipping unit to make the eye region have a predetermined size;
    a second extraction unit adapted to extract a second feature amount indicating a direction of an eye existing in the eye region from the eye region having the predetermined size which is enlarged or reduced by said enlargement/reduction unit; and
    an estimation unit adapted to estimate a gaze direction of the object from the first feature amount and the second feature amount.

2. The apparatus according to claim 1, wherein said clipping unit is configured to clip, as the eye region, a rectangular region including a feature point indicating a position of at least one of an external canthus, a position of an internal canthus, a position of an upper eyelid, and a position of lower eyelid.

3. The apparatus according to claim 1, wherein said second extraction unit is configured to extract, as the second feature amount, one of a first derivative value and a second derivative value of pixel values constituting the eye region enlarged or reduced by said enlargement/reduction unit and having the predetermined size.

4. The apparatus according to claim 1, wherein said first extraction unit is configured to extract, as the first feature amount, one of a first derivative value and a second derivative value of pixel values constituting the low-resolution image.

5. An information processing method comprising:
    a detection step of detecting a face region and an eye region of an object from an obtained image of the object;
    a generation step of generating normalized images of a high-resolution image and low-resolution image from the obtained image of the face region based on a positional relationship between the face region and the eye region in the image;
    a first extraction step of extracting a first feature amount indicating a direction of a face existing in the face region from the low-resolution image;
    a feature point detection step of detecting a position of a feature point indicating the eye region in the normalized image of the high-resolution image;
    a clipping step of clipping the eye region in the normalized image of the high-resolution image based on the position of the feature point detected in said feature point detection step;
    an enlargement/reduction step of enlarging or reducing the eye region clipped in said clipping step to make the eye region have a predetermined size;
    a second extraction step of extracting a second feature amount indicating a direction of an eye existing in the eye region from the eye region having the predetermined size which is enlarged or reduced in said enlargement/reduction step; and
    an estimation step of estimating a gaze direction of the object from the first feature amount and the second feature amount.

6. A non-transitory computer-readable storage medium storing a computer program for causing a computer to execute an information processing method defined in claim 5.

* * * * *